(12) United States Patent
Chen

(10) Patent No.: US 11,453,088 B2
(45) Date of Patent: Sep. 27, 2022

(54) PROCESS AND COMPOSITION FOR FORMATION OF HYBRID ALUMINUM COMPOSITE COATING

(71) Applicant: HER MAJESTY THE QUEEN IN RIGHT OF CANADA, AS REPRESENTED BY THE MINISTER OF NATURAL RESOURCES, Ottawa (CA)

(72) Inventor: Zheng James Chen, Dundas (CA)

(73) Assignee: HER MAJESTY THE QUEEN IN RIGHT OF CANADA, AS REPRESENTED BY THE MINISTER OF NATURAL RESOURCES

( * ) Notice: Subject to any disclaimer, the term of this patent is extended or adjusted under 35 U.S.C. 154(b) by 0 days.

(21) Appl. No.: 17/264,463

(22) PCT Filed: Sep. 18, 2019

(86) PCT No.: PCT/CA2019/051321
§ 371 (c)(1),
(2) Date: Jan. 29, 2021

(87) PCT Pub. No.: WO2020/056505
PCT Pub. Date: Mar. 26, 2020

(65) Prior Publication Data
US 2021/0316398 A1 Oct. 14, 2021

Related U.S. Application Data

(60) Provisional application No. 62/734,242, filed on Sep. 20, 2018.

(51) Int. Cl.
*B23K 26/342* (2014.01)
*B22F 7/04* (2006.01)
*C23C 24/10* (2006.01)

(52) U.S. Cl.
CPC ............. *B23K 26/342* (2015.10); *B22F 7/04* (2013.01); *C23C 24/103* (2013.01)

(58) Field of Classification Search
CPC ........ B23K 26/342; B22F 7/04; C23C 24/103
See application file for complete search history.

(56) References Cited

U.S. PATENT DOCUMENTS

| | | | |
|---|---|---|---|
| 2008/0085368 A1* | 4/2008 | Gauthier | B23K 26/0823 427/595 |
| 2009/0095214 A1* | 4/2009 | Whitfield | B05B 7/228 118/50.1 |
| 2011/0226390 A1* | 9/2011 | Chen | B23K 35/0244 228/256 |

FOREIGN PATENT DOCUMENTS

| | | |
|---|---|---|
| CN | 105925978 | 9/2016 |
| CN | 104480460 | 1/2017 |
| CN | 106350816 | 1/2017 |
| CN | 106756985 | 5/2017 |
| KR | 100427975 | 4/2004 |
| KR | 100427975 B1 * | 4/2004 |

OTHER PUBLICATIONS

Hu, Laser processing to create in-situ Al—SiCp surface metal matrix composites, Journal of Materials Science, 30 (1995), p. 891-897 (Year: 1995).*
Fabrication and Oxidation behavior of Al4SiC4 powders, Journal of the American Ceramic Society, 2017, 100, p. 3145-3154 (Year: 2017).*
Hu. C., et al. "Laser processing to create in-situ Al—SiC surface metal matrix composites" Journal of Materials Science 30. 891-897. 1995 Chapman & Hall. 7 Pages.
Mabhali, L., et al. "Laser alloying of Al with mixed Ni, Ti and SiC powders". School of Chemical and Metallurgical Engineering. University of Witwatersrand, South Africa. 6 Pages.
Ocelik, V., et al. "Sliding wear resistance of mental matrix composite layers prepared by high power laser" Science Direct. Elsevier. 2004. 13 Pages.
Liu, J., et al. "Particle distribution in coatings on aluminum alloy surface clad with laminar plasma jet" 2005. China Academic Journal Electronic Publishing House. 3 Pages.
Mishra, R.S., et al. "Friction stir processing: a novel technique for fabrication of surface composite" Materials Science & Engineering A341. 2003 Elsevier. 4 Pages.
Gandra, J., et al. "Wear characterization of functionally graded Al—SiC composite coatings produced by friction surfacing" Materials and Design. 2013. Elsevier. 11 Pages.
Yang, H., et al. "Fabrication and characterization of in situ synthesized SiC/Al composites by combustion synthesis and hot press consolidation method" vol. 2017, Article ID 9314740. Wiley. Hindawi. 12 Pages.
ISR & Written Opinion issued on corresponding PCT International Application No. PCT/CA/2019/051321 dated Nov. 29, 2019. 10 Pages.
Anandkumar et al: "Microstructure and wear studies of laser clad Al—Si/SiC"("p") composite coatings, Surface and Coatings Technology, Elsevier, NL, vol. 201, No. 24, Aug. 30, 2007 (Aug. 30, 2007), pp. 9497-9505, XP022222791, ISSN: 0257-8972, DOI: 10.1016/J.SURFCOAT.2007.04.003 2. Experimental details; p. 9500 3.1 Microstructure; pp. 9501-9950.

(Continued)

*Primary Examiner* — Tabatha L Penny
(74) *Attorney, Agent, or Firm* — McDonald Hopkins LLC

(57) ABSTRACT

Process for formation of composite coatings and composite coatings formed thereby. A process for formation of a metal-matrix composite coating on a surface of a substrate is provided. The substrate is an aluminum alloy. The metal-matrix composite coating is formed on the substrate through laser deposition using filler materials comprising aluminum, silicon and graphite. The particles forming the metal-matrix composite coating are formed in-situ from the filler materials. A metal-matrix composite coating obtained by the laser deposition process with in-situ formation of particles is also provided.

10 Claims, 8 Drawing Sheets

(56) References Cited

OTHER PUBLICATIONS

Li, Shiwei "Study on Ternary Carbide AL4SiC4 with Aluminum Powders as Raw Materials" Ceramics Science and Art, vol. 41(2), pp. 19-32, Dec. 2007.
Office action issued on corresponding Chinese Patent Application No. 201980061846.7 dated Jul. 14, 2022. 8 pages.

* cited by examiner

PROCESS AND COMPOSITION FOR FORMATION OF HYBRID ALUMINUM COMPOSITE COATING

CROSS-REFERENCE TO RELATED APPLICATION

This application is a 35 U.S.C. 371 national stage filing of PCT Application No. PCT/CA2019/051321 filed on Sep. 18, 2019, entitled "PROCESS AND COMPOSITION FOR FORMATION OF HYBRID ALUMINUM COMPOSITE COATING," which claims priority to U.S. Provisional Application No. 62/734,242 filed on Sep. 20, 2018 each of which are incorporated by reference herein in their entireties.

TECHNICAL FIELD

The present invention relates to processes for the formation of metal-matrix composites coating aluminum substrates. More specifically, the present invention relates to processes for forming metal-matrix composites on aluminum alloy substrates by in-situ formation of a composite coating using laser deposition.

BACKGROUND

Aluminum alloys possess excellent properties such as great strength to weight ratio, low density, good plasticity and ductility, as well as good corrosion resistance. Such alloys find extensive applications, for example in automobile, aerospace. and high-speed train fields.

However, the use of aluminum alloys in heavy-duty environments is limited due to their low hardness and poor wear resistance. For example, the application of aluminum alloys in systems stressed due to wear and/or thermal effects, such as engine components, expose the need for additional modifications of the functional surface. It is therefore desired to develop advanced materials and processing technologies for, among other reasons, the improvement of wear-resistance.

Different surface engineering technologies have been applied to aluminum alloys to improve wear resistance. For example, thermal spray coatings have been extensively used to coat engine cylinder bores, with a view to improving the wear resistance of the surface of the cylinder bores. However, thermal spraying coatings readily spall off due to poor mechanical adhesion with the substrate and extensive porosity.

On the other hand, laser surface deposition (alloying or cladding), hereafter called deposition, possesses many advantages over thermal spray processes. Indeed, laser deposition provides thick and dense coatings that metallurgically bond to the substrate, that have low stress and low distortion, and that have refined microstructures.

Moreover, it has been demonstrated that particulate reinforced aluminum metal matrix composites (Al-MMCs) can considerably improve the strength and hardness of aluminum alloys and, hence, wear resistance. A typical example is aluminum matrix composites reinforced with particulate silicon carbide, SiC, which have extensively been studied over the last two decades and are currently widely applied in the aerospace, automotive, and electronics industries. Al-MMCs have exhibited excellent properties such as light-weight, high specific modulus, and excellent wear resistance.

In addition, when aluminum alloys are used in high-temperature environments applications where oils and greases cannot be used, lubrication problems have been an issue. To remedy this problem, graphite, as a solid lubricant, has been-added to Al alloy or to Al/SiC bulk MMC to form advanced hybrid Al-MMC with excellent self-lubrication properties within a wide temperature range. Self-lubricating MMC-materials offer many improvements over traditional materials that need periodic application of lubricants.

Some of the major drawbacks of the above materials are: their high cost and their complex production methods when compared to conventional monolithic alloys.

Generally, SiC particulates reinforced aluminum matrix composites can be fabricated using several ex-situ method approaches such as melt-stirring, infiltration, and rheological casting techniques. Among the manufacturing processes for particulate metal matrix composites, the melt-stirring method is the most frequently used for its low cost, simplicity, and high production rate. In this method, preheated SiC particles are injected into the molten aluminum and the high-speed rotation of the impeller is the driving force for melt mixing. However, it is extremely difficult to disperse the reinforcing particles uniformly in metal melts due to their low-wettability with the melt. Furthermore, due to porosity and segregation at the interface between the matrix and reinforcement, the interface bonding may be lowered.

Currently, known processes for manufacturing SiC/Al composite coatings include laser deposition. Known processes for producing bulk SiC/Al MMC composite include powder metallurgy or liquid casting or gas pressure infiltration methods. Unfortunately, the resulting materials have a number of drawbacks. The interfacial reaction between SiC particles and the aluminum matrix cannot be avoided, thereby resulting in the formation of a soft and brittle $Al_4C_3$ phase during laser deposition. This is harmful to the mechanical properties of the composite. In addition, $Al_4C_3$ undergoes rapid etching in wet environments, generating amorphous Al—O compounds, entailing considerable strain on the aluminum matrix due to increasing volume during hydration. Cracks are usually formed between $Al_4C_3$ and the matrix as well as within the $Al_4C_3$ due to its brittleness and high stress. Poor wettability between the reinforcements and the matrix is another major problem of known ex-situ processing methods, leading to the formation of porosities in the coating.

In view of the above, there is a need for improved processing techniques for the synthesis of MMCs in which reinforcements are more stable. Preferably, such processing techniques also lead to less degradation while providing strong interfacial bonding and a more uniform matrix.

SUMMARY

The present invention provides a process for the formation of a metal-matrix composite coating on a substrate.

In a first aspect, the present invention provides a process for the formation of a metal-matrix composite coating on a surface of a substrate, the method comprising:
 a) melting a first portion of said surface of said substrate with a high-energy power source to form a melt pool in a melt zone;
 b) feeding filler materials into the melt zone, wherein said filler materials comprises aluminum powder, silicon powder and graphite powder;
 c) subjecting the melt zone and filler materials to the high-energy power source to allow for an in-situ reaction and formation of a solid deposit on said first portion of said surface of said substrate; and d) repeating steps a) to c) on multiple adjacent portions of said surface of said substrate to provide a continuous layer of the solid deposit thereby forming the metal-matrix composite coating.

In a second aspect, the present invention provides a metal-matrix composite coating on a surface of a surface, wherein the metal-matrix composite coating is formed by:

a) melting a first portion of said surface of said substrate with a high-energy power source to form a melt pool in a melt zone;

b) feeding filler materials into the melt zone, wherein said filler materials comprises aluminum powder, silicon powder and graphite powder;

c) subjecting the melt zone and filler materials to the high-energy source to allow for an in-situ reaction and a formation of a solid deposit on said first portion of said surface of said substrate; and d) repeating steps a) to c) on multiple adjacent portions of said surface of said substrate to provide a continuous layer of the solid deposit forming the metal-matrix composite coating.

BRIEF DESCRIPTION OF THE DRAWINGS

The present invention will now be described by reference to the following figures, in which identical reference numerals refer to identical elements and in which.

DETAILED DESCRIPTION

Figure 1A:
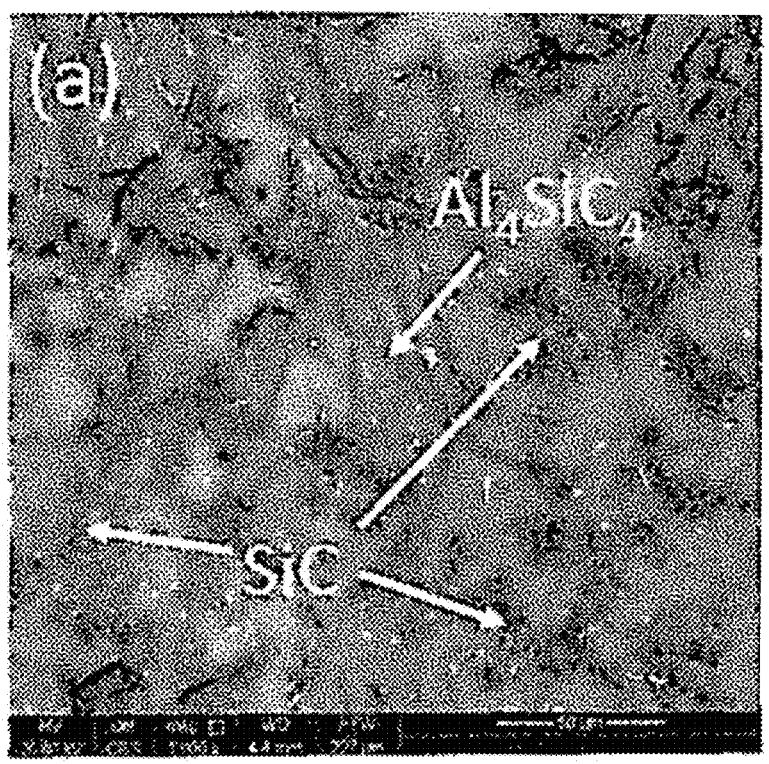
FIGS. 1(a)-(b) are scanning electron microscope (SEM) images of the microstructure of a composite coating according to an embodiment of the present invention.

In order to overcome the problems of conventional ex-situ processes, a number of in-situ processing techniques have been developed for synthesizing MMCs. In these techniques, the reinforcements are synthesized in matrix by chemical reactions between elements contained in the material system. Compared to aluminum matrix composites produced by ex-situ methods, the composites produced by the in-situ techniques exhibit the following advantages: (a) the in-situ formed reinforcements are thermodynamically stable at the matrix, leading to less degradation under the elevated temperature conditions; (b) the reinforcement-matrix interfaces are clean, resulting in a strong interfacial bending; and (c) the in-situ formed reinforcing particles are finer in size and their distribution in the matrix is more uniform.

In one aspect, the present invention provides a process for the formation of a metal-matrix composite coating on a surface of a substrate. In particular, the present invention provides a process for the formation of a self-lubricated Al-MMCs coating reinforced by SiC and $Al_4SiC_4$ particles formed in-situ and a composite coating produced thereby.

It should be clear that the substrate which may be used with the invention may be aluminum alloys, for example, cast A356 alloy. The substrate may be submitted to a preparation step prior to undergoing the coating process of the present invention. For example, the surface of the substrate may be cleaned, brushed, sanded, submitted to an ultrasonic treatment, or any known preparation technique.

Filler materials are used for forming the reinforcements in-situ in the form of particles and the metal-matrix. The filler materials may be in the form of a powder. The fillers materials may be a mixture of aluminum (Al) powder, silicon (Si) powder and graphite powder. The powder size may be from 20 µm to 200 µm and preferably from 30 µm to 50 µm. The composition of the mixed powder may consist essentially of aluminum (from 30% to about 65% by mole fraction), silicon (from about 20% to about 50%) and graphite (from 10% to about 30%).

In one embodiment, the mixing of the powders of the filler materials is accomplished using a mixer. However, any known techniques or apparatuses for mixing may be used. In one example, the powders are mixed for more than one hour before the deposition process. In one implementation, a ball milling machine is used to both mix and mill the powders for more than three hours. The filler materials, in the form of the mixed powder, may then be fed by a feeder into a co-axial nozzle or multi-lateral nozzles as the coating is deposited on the substrate.

In another embodiment, the mixing of powder for the filler material can be performed simultaneously with the deposition of the coating on the substrate. In order to mix the powder in-situ, three powder feed machines may be used and the co-axial nozzle or multi-lateral nozzles may have multiple inlets. When using a three-inlet nozzle, at least one of the inlets may be used to feed the aluminum powder. The other two inlets may then be used to feed silicon powder and graphite powder, respectively. The ratio between the various filler materials in the composition may be adjusted by adjusting the individual powder feed rates.

The method of the present invention further comprises the step of subjecting a portion of the surface of the substrate to a high-energy power source to cause shallow melting of a portion of the surface to thereby forming a melt pool defining a melt zone. The filler materials may then be fed into the melt zone, either as a pre-mixed powder or through separate inlets as mentioned above.

After the filler materials have been added to the melt zone, the melt pool with added filler materials is subjected to a further exposure to the high-energy source to allow an in-situ reaction and to cause the formation of a solid deposit on the portion of the surface of the substrate. The reaction involves in-situ formation of SiC particles and $Al_4SiC_4$ plates or plate-like, which provides reinforcements to the matrix for formation of a solid deposit on the surface. The solid deposit may be in the form of beads of composite. The process may then be repeated to result in multiple adjacent beads that form a continuous layer of metal-matrix composite coating on the substrate. This process of creating a continuous layer can be repeated several times, such that several layers may be applied in order to reach a certain thickness of the metal-matrix composite coating.

In another embodiment, instead of producing a coating on the substrate, the process and the composition may be utilized to generate aluminum matrix composite parts or prototypes consisting of in-situ SiC and $Al_4SiC_4$ reinforcements from the ground-up via layer-by-layer deposition. Thus, an opportunity to generate complex-shaped, functionally graded or custom-tailored parts that can be utilized for a variety of engineering applications may be provided.

The high energy-power source in the method of the present invention may be a laser. In some embodiments, the laser power can be from 100 W to 5000 W, and preferably from 500 W to 3000 W. The laser spot size may be from 1 mm to 5 mm, but preferably from 2 mm to 3 mm. The deposition speed may be from 2 mm/s to 15 mm/s, and preferably from 5 mm/s to 10 mm/s.

In another embodiment, instead of the process of laser powder deposition with aluminum-silicon-graphite powders, components or prototypes consisting of in-situ SiC and $Al_4SiC_4$ reinforcements may be produced by powder bed fusion 3D printing technology with pre-mixed aluminum-silicon-graphite powders. The powder size may be accordingly reduced to the typical range for powder bed fusion 3D printing process.

In another embodiment, part of graphite powder may be replaced by graphene or carbon nanotubes.

In another embodiment, in addition to aluminum, silicon and graphite, a small quantity of alloying elements such as Cu, Mg, Mn, Ni, Ti, Cr, Fe and B may be added into the powder to form a stronger aluminum alloy matrix.

In yet another embodiment, in order to prevent the formation of $Al_4C_3$ in the heat-affected zone due to the diffusion of carbon into the heat-affected zone reacting with aluminum, an aluminum-silicon mixed powder (without graphite) with a minimum silicon content of 20% in weight percent may be utilized for the first layer during laser deposition.

The metal-matrix composite coating formed by the process of the present invention provides more stable reinforcements particles, leading to less degradation. Furthermore, the in-situ formed reinforcements are finer in size and are more uniformly distributed in the matrix. The reinforcement-matrix interface formed by the process of the present invention provides strong interfacial bonding. Finally, the graphite present in the metal-matrix composite coating gives the substrate a self-lubricating property.

Examples

Commercial A 356 cast alloy plates (50 mm×100 mm×4 mm) with nominal composition of Al-7% Si—Mg—Fe were employed as substrates. Prior to laser deposition, the surface of substrates was brushed with a stainless bristle and cleaned in acetone in an ultrasonic bath for 20 min. The mixed powder of Al-12Si powder (44-105 µm, METCO™ 52C-NS), Si powder (44-200 µm) and graphite powder (78-150 µm) were produced using a mixing machine to achieve a composition of Al-32 wt. % Si-11 wt. % C composition ($AlSi_{28}C_{21}$ mole ratio). The mixed powders were stored in an oven at 60° C. to prevent the powders from moisture. The laser deposition was carried out using a 3 kW continuous wave fiber laser (IPG YLS-3000) with a laser power of 3 kW at a speed of 8 mm/s. During deposition at focal point with a 200 mm focusing lens, the powders were fed into the melt pool via a coaxial nozzle (Fraunhofer COAX™ 8) with a stand-off distance of 15 mm. The beam spot size was 3 mm at the focal point. Argon was used as a shielding gas and as carrier gas at a flow rate of 20 l/min and 2 l/min, respectively, to prevent the melt pool from oxidation.

Figure 1B:
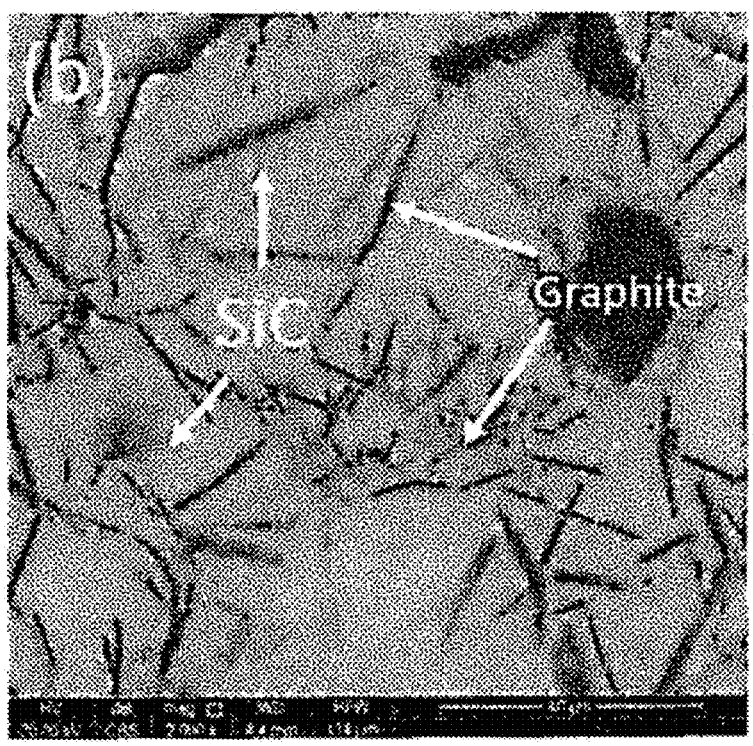
Figure 2A:
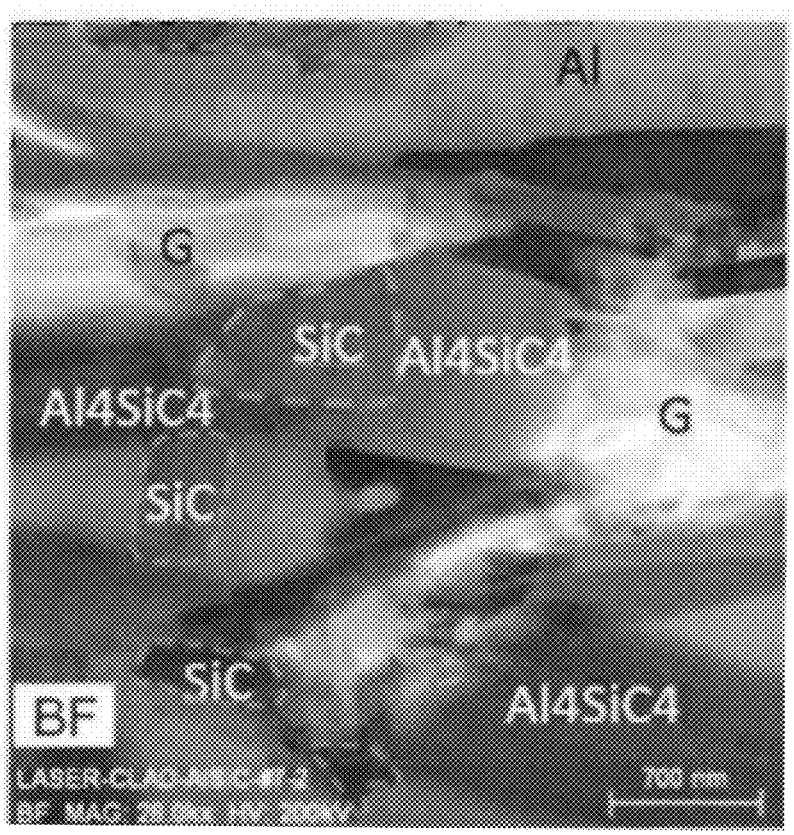
FIGS. 2(a)-(f) are transmission electron microspore (TEM) images of the microstructure, elements mapping and selected area diffraction of a composite coating according to an embodiment of the present invention.
Figure 2B:
Figure 2C:
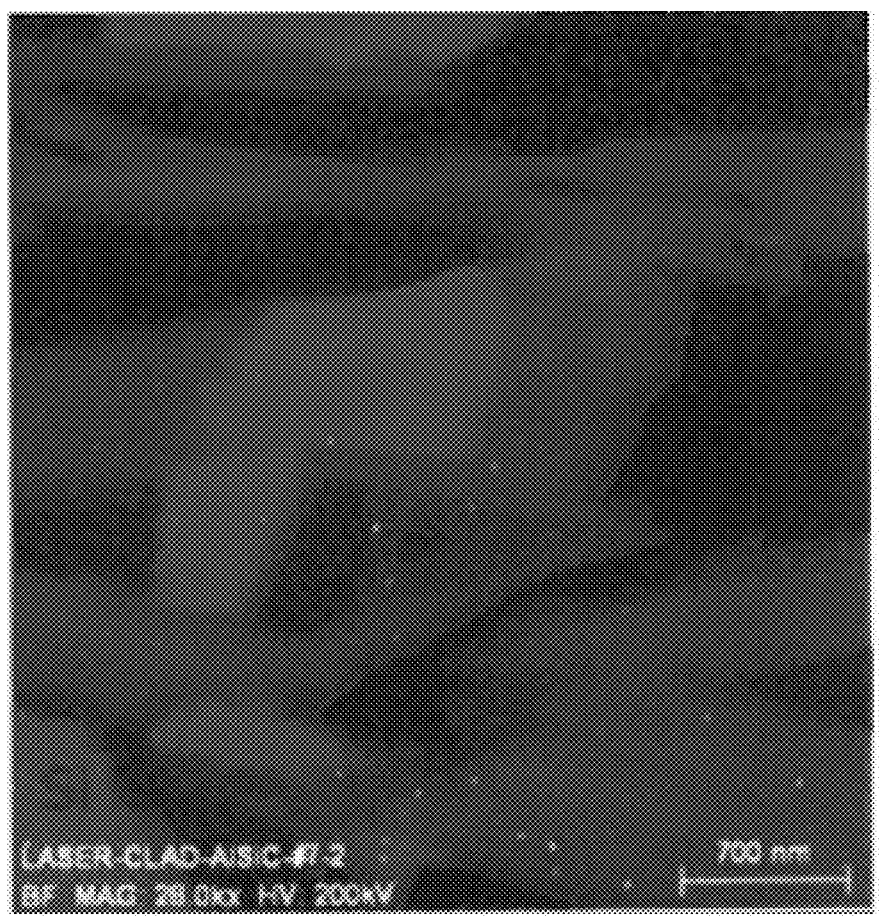
Figure 2D:
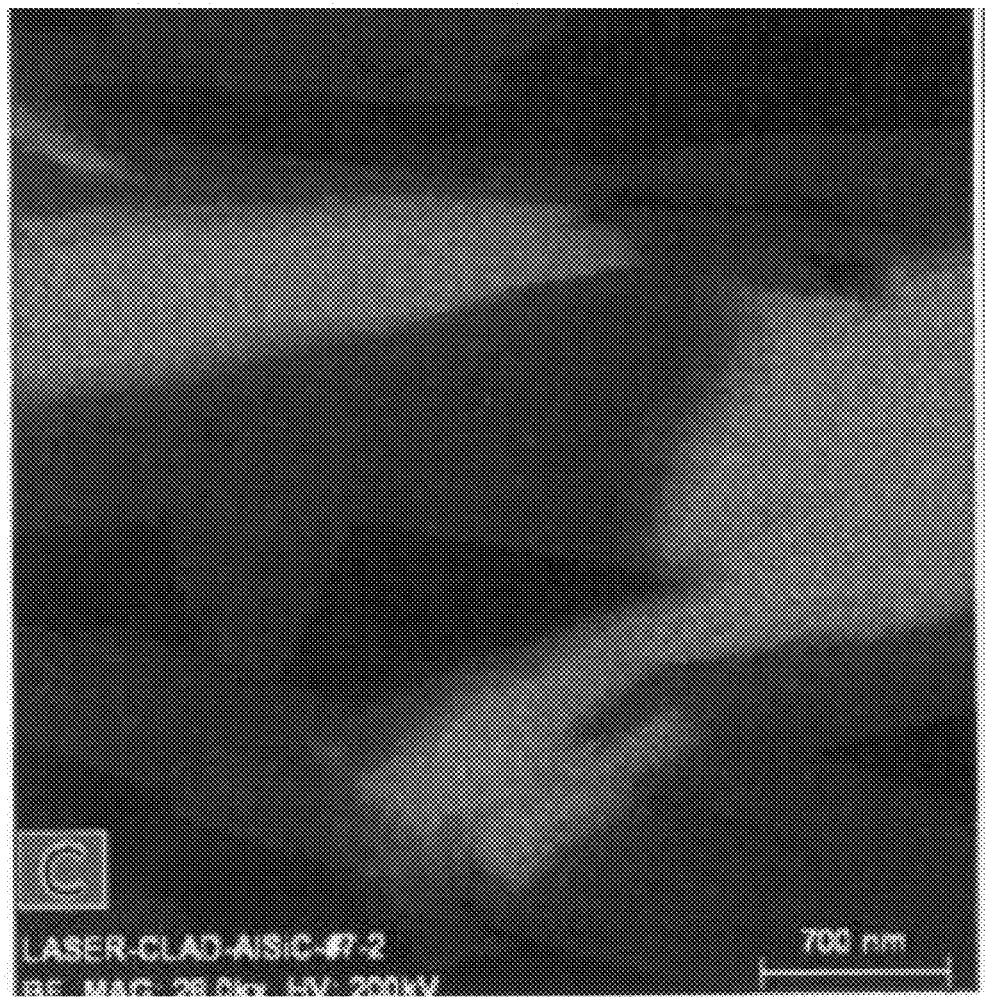
Figure 2E:
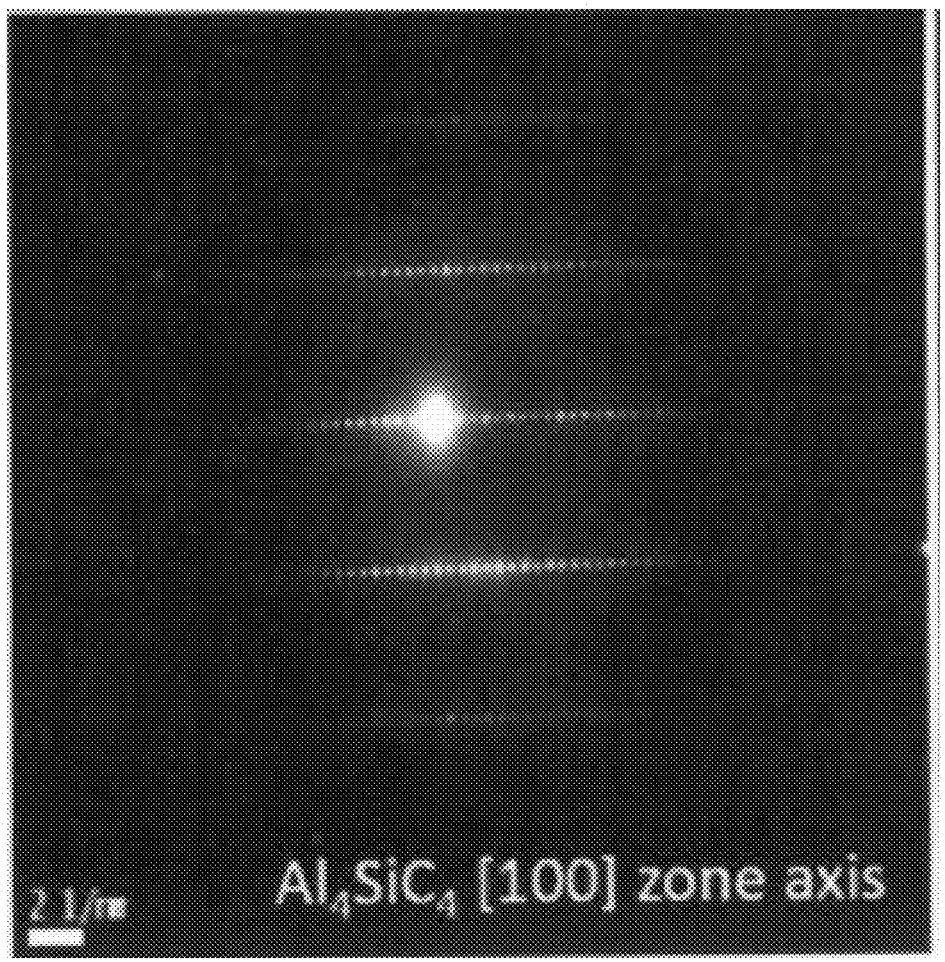
Figure 2F:
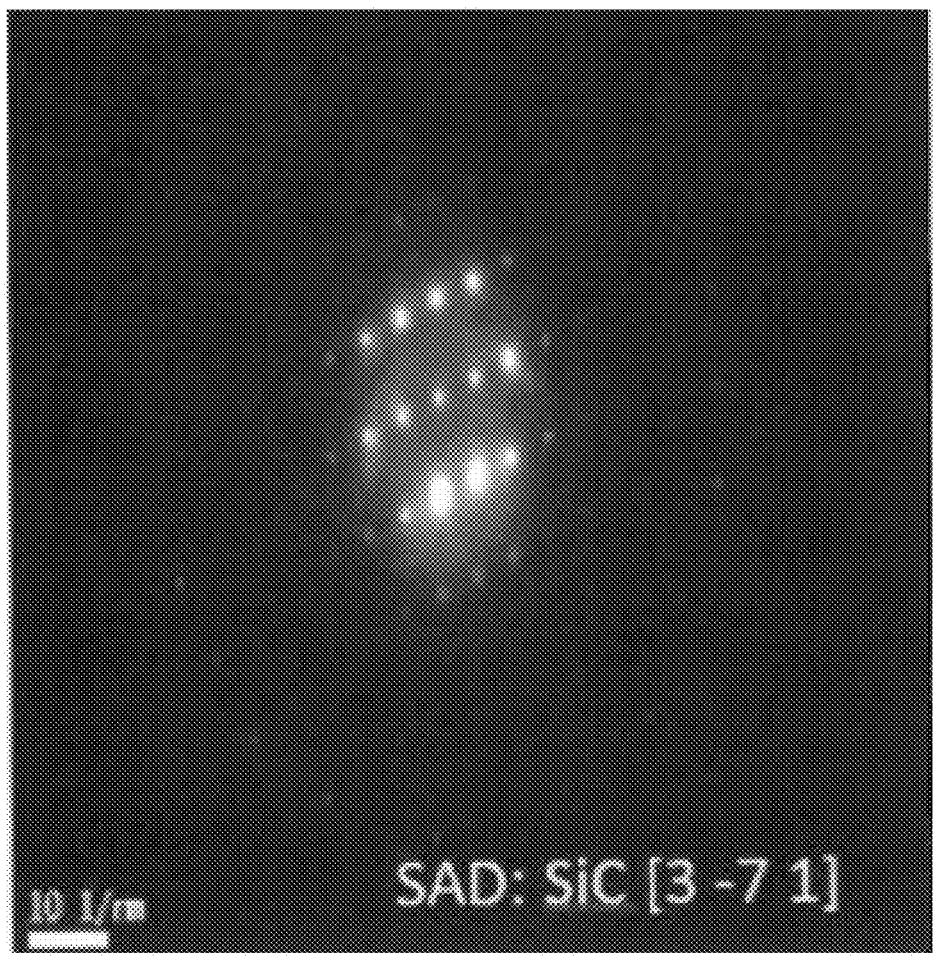

After deposition, the samples were cut and polished for metallurgical evaluation and characterization. The volume percentage of in-situ formed SiC was estimated to be around 25% to 35%, as can be seen from FIG. 1(a). The in-situ formed SiC showed the morphology of both blocky and elongated SiC. The size of the most in-situ formed SiC particles was in the range of 1-6 µm with some in the nanometer range, whereas the elongated SiC was 10-45 µm long and 2-5 wide. Partially dissolved graphite powders and re-precipitated feather-like graphite were observed, as shown in FIG. 1(b). As well, in addition to the in-situ formed SiC, $Al_4SiC_4$ phase was also formed in-situ. Most importantly, and as opposed to known ex-situ Al-MMC coating, the present process does not show a harmful reaction product between Al(Si) matrix and in-situ formed SiC particles, as shown in FIGS. 2(a)-(f). FIGS. 2(a)-(f) are images of the microstructure of the resulting coating.

The hardness test showed that the average hardness of the coating is HV 180, which almost doubles the hardness of the untreated substrate, A356 T6 substrate (HV 99). Pin-on-disc wear tests per ASTM G99 showed that the coating is about 3.5 times better than the untreated substrate A356 T6. In addition, the friction coefficient of the substrate with coating of the present invention was reduced to below 0.5, compared to 0.6 for the untreated A356 T6 substrate.

A person understanding this invention may now conceive of alternative structures and embodiments or variations of the above all of which are intended to fall within the scope of the invention as defined in the claims that follow.

What is claimed is:

1. A process for formation of a metal-matrix composite coating on a surface of a substrate, the method comprising:
    a) melting a first portion of said surface of said substrate with a high-energy power source to form a melt pool in a melt zone;
    b) feeding filler materials into the melt zone, wherein said filler materials comprises aluminum powder, silicon powder and graphite powder;
    c) subjecting the melt zone and filler materials to the high-energy power source to allow for an in-situ reaction and formation of a solid deposit on said first portion of said surface of said substrate; and
    d) repeating steps a) to c) on multiple adjacent portions of said surface of said substrate to provide a continuous layer of the solid deposit thereby forming the metal-matrix composite coating,
    wherein the filler materials have a following composition ratio by mole fraction:
        aluminum from about 30% to about 65%;
        silicon from about 20% to about 50%; and
        graphite from about 10% to about 30%.

2. The process of claim 1, wherein the substrate is an aluminum alloy.

3. The process of claim 1, wherein the high-energy source is a laser.

4. The process of claim 1, wherein the filler materials are mixed prior to feeding said filler materials into the melt zone.

5. The process of claim 1, wherein the filler materials are fed through at least one feeding nozzle.

6. The process of claim 1, wherein the filler materials are each fed through separate inlets of a feeding nozzle.

7. The process of claim 1, wherein the in-situ reaction in step c) provides formation of SiC particles and Al4SiC4 plates.

8. The process of claim 7, wherein the SiC particles and Al4SiC4 plates provide reinforcements for an aluminum matrix to form the solid deposit.

9. The process of claim 1, further comprising repeating steps a) to d) to form a second layer on top of the continuous layer.

10. The process of claim 1, further comprising repeating steps a) to d) multiple times to form multiple layers on top of the continuous layer.

* * * * *